(12) United States Patent
Langenbacher et al.

(10) Patent No.: US 11,105,416 B2
(45) Date of Patent: Aug. 31, 2021

(54) PRESSURE BACK-UP VALVE

(71) Applicant: ZF Friedrichshafen AG, Friedrichshafen (DE)

(72) Inventors: Florian Langenbacher, Kressbronn (DE); Tobias Schmidt, Potsdam (DE); Hans-Joachim Martin, Kressbronn (DE); Rainer Novak, Bregenz (AT)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/900,205

(22) Filed: Jun. 12, 2020

(65) Prior Publication Data
US 2020/0393040 A1    Dec. 17, 2020

(30) Foreign Application Priority Data
Jun. 13, 2019   (DE) .................... 10 2019 208 614.4

(51) Int. Cl.
*F16H 51/00*    (2006.01)
*F16H 61/00*    (2006.01)
(Continued)

(52) U.S. Cl.
CPC .......... *F16H 61/0021* (2013.01); *F15B 11/16* (2013.01); *F16H 61/0204* (2013.01); *F16H 61/0251* (2013.01); *F16K 11/02* (2013.01); *F15B 2211/20515* (2013.01); *F15B 2211/20538* (2013.01); *F15B 2211/50* (2013.01); *F16H 2061/0253* (2013.01)

(58) Field of Classification Search
CPC ............ F16H 61/0021; F16H 61/0204; F16H 61/0251; F16H 2061/0253; F16D 2048/0209
See application file for complete search history.

(56) References Cited

U.S. PATENT DOCUMENTS

| | | | |
|---|---|---|---|
| 5,129,500 A * | 7/1992 | Potter ..................... | F16D 25/14 137/625.6 |
| 6,793,053 B2 * | 9/2004 | Jackson .................. | F16D 25/14 192/3.3 |

(Continued)

FOREIGN PATENT DOCUMENTS

DE    102014216580 A1    2/2016

*Primary Examiner* — Abiy Teka
(74) *Attorney, Agent, or Firm* — Dority & Manning, P.A.

(57) ABSTRACT

A pressure back-up valve (300) includes a release piston (320) movable between first and second stop positions and a closing body (340) movable to a closing position in which this separates first and second connection pressure chambers (327, 326) when the release piston (320) is in a first stop position. The release piston (320) moves the closing body (340), in the second stop position, into an opening position. The release piston (320) is pressurizable on a first pressure surface (A1) from a first side via a third connection pressure chamber (324) and on a second pressure surface (A2) from a second side via a second connection pressure chamber (326). The closing body (340) is pressurized, in the closing position, from a first side via the second connection pressure chamber (326) on a first pressure surface (A4) and from a second side via the first connection pressure chamber (327) on a second pressure surface (A3) of the closing body (34).

16 Claims, 6 Drawing Sheets

(51) Int. Cl.
*F16K 11/02* (2006.01)
*F16H 61/02* (2006.01)
*F15B 11/16* (2006.01)

(56) References Cited

U.S. PATENT DOCUMENTS 8,991,276 B2 * 3/2015 Herrmann ............. F16H 61/061
                                                         74/335
9,995,384 B2 * 6/2018 Herrmann ............. F16K 15/183

* cited by examiner

PRESSURE BACK-UP VALVE

CROSS-REFERENCE TO RELATED APPLICATION

The present application is related and has right of priority to German Patent Application No. 10 2019 208 614.4 filed on Jun. 13, 2019, which is incorporated by reference in its entirety for all purposes.

FIELD OF THE INVENTION

The invention relates generally to a pressure back-up valve for a hydraulic system of a transmission, a hydraulic system including the aforementioned pressure back-up valve for a transmission, a transmission for an electric drive including this type of hydraulic system, and a method for operating the hydraulic system.

BACKGROUND

DE 10 2014 216 580 A1 of the applicant describes a hydraulic system including a pressure back-up valve for an automatic transmission, in the case of which, after an actuation of the shift element, the pressure that acts upon the shift element in a clutch cylinder with the aid of the pressure back-up valve. Therefore, the shift element remains engaged regardless of a system pressure generated by the gear pump, so that a torque is transmittable via the shift element even when the system pressure is lowered below a pressure value that is necessary in the shift element in order to transmit a desired torque. In the extreme case, the gear pump could even be switched off. The pressure back-up valve is designed as a stop-check valve in this case. Due to the lowering of the pressure generated by the gear pump, a support torque of the gear pump and, therefore, the power loss of the automatic transmission decrease according to the pressure reduction, which results in an increase of the transmission efficiency. In this prior art, the check valve is designed in such a way that the check valve is closed with the aid of a compression spring if the automatic transmission and, therefore, the pump are stopped, whereby the hydraulic system of the automatic transmission is non-pressurized. This property of pressure back-up valves is also referred to as "normally closed". In contrast thereto, valves referred to as "normally open" must be kept closed with the aid of a pressurization. These are open under the effect of a spring force and, therefore, the shift element is also non-pressurized and disengaged, and so the shift element cannot transmit a torque, provided the gear pump generates no pressure. The "non-pressurized" condition is understood to mean that no pressure is generated by a pump, and so the pressure in the hydraulic system of the automatic transmission at least approximately corresponds to the atmospheric pressure of the atmosphere surrounding the automatic transmission. The atmospheric pressure is also referred to as ambient pressure.

One advantage of a stop-check valve according to the aforementioned prior art is that the so-called clutch pressure enclosed in the shift element can be increased or replenished in the engaged condition of the shift element, without the shift element being disengaged. The pressure loss, which arises during the through-flow of the check valve, is disadvantageous, however. This means, the system pressure generated by the gear pump is always slightly higher than the desired clutch pressure. Since this elevated pressure must be additionally generated by the gear pump, this has a disadvantageous effect on the efficiency of the automatic transmission.

SUMMARY OF THE INVENTION

Example aspects of the invention provide a hydraulic system including a pressure back-up valve for an automatic transmission having a highest possible efficiency. In particular, the pressure to be generated by the gear pump and, therefore, the power loss arising due to the gear pump should be minimal.

Accordingly, a pressure back-up valve includes a control device, a closing device, and a valve housing. The control device includes a release piston and the closing device includes a closing body. The valve housing includes multiple connection pressure chambers. The release piston can assume a first stop position or a second stop position. The closing body can assume a closing position in which the closing body separates a first and a second connection pressure chamber from each other when the release piston is in the first stop position. The release piston, in the second stop position, is mechanically active upon the closing body in such a way that the closing body is in an opening position in which the first and the second connection pressure chambers are hydraulically connected to each other.

The connection pressure chambers are arranged in such a way that the release piston is pressurizable on a first pressure surface from a first side via a third connection pressure chamber and on a second pressure surface from a second side via at least the second connection pressure chamber. The closing body is pressurizable from a first side via the second connection pressure chamber on a first pressure surface of the closing body and from a second side via the first connection pressure chamber on a second pressure surface of the closing body when the closing body is in the closing position.

In one preferred example embodiment, it is possible that the pressure back-up valve includes a fourth connection pressure chamber, and that a portion of the second side of the release piston is pressurizable in the second connection pressure chamber and the remaining portion of the second side is pressurizable in the fourth connection pressure chamber. In sum, a surface of the second side of the release piston is pressurized, the surface area of which corresponds to the second pressure surface.

In one further preferred example embodiment, the two pressure surfaces of the release piston have the same surface area.

In one further preferred example embodiment, it is possible that the closing body is axially movable in a bore section of the valve housing, wherein the closing body, in the closing position, rests against a valve seat, and so the valve seat and the closing body form a seat valve. The bore section includes the first connection pressure chamber and, at the end of the valve housing, a further connection pressure chamber. In addition, the first connection pressure chamber and the further connection pressure chamber are hydraulically connected to each other within or outside the valve housing.

In one further preferred example embodiment, the closing device includes a compression spring. A support element is arranged or formed in the bore section at the end of the valve housing. The compression spring is arranged in a preloaded manner between the support element and the closing body, and the force of the compression spring is active upon the closing body in the direction of the closing position.

In one further preferred example embodiment, it is possible that, in the closing position of the closing body, the first pressure surface of the closing body, which is pressurizable by the first connection pressure chamber, is the same size as the second pressure surface of the closing body, which is pressurizable via the second connection pressure chamber.

Alternatively, it is possible that, in the closing position of the closing body, the first pressure surface of the closing body, which is pressurizable by the first connection pressure chamber, is larger than the second pressure surface of the closing body, which is pressurizable via the second connection pressure chamber.

In one further preferred example embodiment, it is possible that the closing device includes a valve seat, which is formed or arranged in the valve housing. The closing body is designed as a ball, wherein the valve seat and the ball form a seat valve. The ball is available as a cost-effective and precisely manufactured structural element and has good sealing properties when utilized as a seat valve.

Alternatively, it would be possible in one preferred example embodiment to design the closing body as a cone or as a piston including a hemispherical or semispherical closing element at one end.

In one further preferred example embodiment, it is possible that the valve housing is designed to be cylindrical on an external contour of the valve housing and includes a valve bore with multiple bore sections, the inner diameters of which are at least partly different.

Preferably, it is possible that the first pressure surface of the release piston, which is pressurizable by the system pressure, is larger than the second pressure surface of the closing body. As a result, it is possible that the closing device can be opened with the aid of a system pressure that is below the pressure value of the clutch pressure enclosed in the shift element.

Preferably, a hydraulic system for a transmission includes an above-described pressure back-up valve, wherein the hydraulic system also includes an electrically driven gear pump, a pressure-adjusting unit, and a hydraulically engageable or disengageable shift element. The electrically driven gear pump generates a system pressure during operation and is hydraulically connected in parallel to the pressure back-up valve and the pressure-adjusting unit. The pressure-adjusting unit, which is also referred to as a clutch valve or a pressure regulator, adjusts a clutch valve pressure downstream from the pressure-adjusting unit depending on the electrical actuation of the pressure-adjusting unit, and is connectable to the shift element with the aid of the pressure back-up valve, so that a clutch pressure prevailing in the shift element corresponds to the clutch valve pressure when the closing device is open. The closing device is designated as open for the case in which the closing body is in the opening position. This is the case when the release piston is pressed into its second stop position by the system pressure. Therefore, the pressure back-up valve is actuated with the aid of the system pressure. When mention is made of a connection between elements of the hydraulic system, this always means a hydraulic connection with the aid of an operating medium. A mechanical or electrical connection would be explicitly mentioned.

In one preferred example embodiment of the hydraulic system, the electrically driven gear pump is connected to the third connection pressure chamber of the pressure back-up valve, so that the release piston is pressurized by the system pressure during the operation of the electrically driven gear pump. In addition, the second connection pressure chamber is connected to the pressure-adjusting unit and is pressurizable by the clutch valve pressure, which is adjustable by the pressure-adjusting unit. In addition, the first connection pressure chamber is hydraulically connected to the shift element, so that the shift element is pressurizable, with the aid of the pressure back-up valve, with the clutch valve pressure set by the pressure-adjusting unit when the closing body is in the opening position.

Preferably, the shift element is designed as "normally open", i.e., the shift element can transfer a torque only when the shift element is pressurized.

In one further preferred example embodiment of the hydraulic system, it is possible that the pressure-adjusting unit includes a clutch valve spool and a solenoid. The clutch valve spool is movable into a first stop position or a second stop position or a control position with the aid of the solenoid, depending on the energization of the solenoid. In the first stop position, the second connection pressure chamber of the pressure back-up valve is connected to the electrically driven gear pump, so that the system pressure prevails in the second connection pressure chamber. In the second stop position, the second connection pressure chamber of the pressure back-up valve is connected to a non-pressurized area. In addition, pressure value between an ambient pressure and the value of the system pressure are settable in control positions of the clutch valve spool between the two stop positions in the second connection pressure chamber of the pressure back-up valve. In the second stop position of the clutch valve spool, the shift element is depressurizable or drainable when the closing body the pressure back-up valve is in the opening position. This is the case when the release piston is in the second stop position under the effect of the system pressure.

The pressure-adjusting unit or the clutch valve is preferably designed as an electrically actuated pressure regulator having an increasing characteristic curve, i.e., the greater the current value is, with which the solenoid is actuated, the higher is the clutch valve pressure that is set downstream from the clutch valve.

Alternatively, the clutch valve can be designed having a decreasing characteristic curve, i.e., the greater the current value is, with which the solenoid is actuated, the lower is the clutch valve pressure that is set downstream from the clutch valve.

Preferably, it is also possible with respect to the hydraulic system that the system pressure generated by the electrically driven gear pump is active upon the release piston from the first side, in the third connection pressure chamber, and the force of the compression spring and the clutch valve pressure set by the pressure-adjusting unit are active upon the release piston from the second side.

If, in the second connection pressure chamber, the sum of the compressive force of the clutch valve pressure onto the corresponding pressure surface of the release piston and the force of the compression spring is as high as the compressive force of the system pressure, which acts in the opposite direction onto the release piston, in the third connection pressure chamber, the release piston is displaced by the closing body upon a further increase of the clutch valve pressure until the closing body rests against the valve seat and the shift element is engaged. The release piston was displaced, as a result, by the closing body into its first stop position. In this case, the clutch pressure enclosed in the shift element is less than the system pressure.

Preferably, it is possible that a transmission for an electric drive includes an above-described hydraulic system.

In one preferred example method for operating the above-described hydraulic system, the clutch valve spool of the pressure-adjusting unit is switched into a second switching position, if the clutch spool valve is not in this position already, in order to fill and pressurize the shift element and in order to enclose the clutch pressure in the shift element. In this second switching position, the second connection pressure chamber is non-pressurized. Simultaneously or thereafter, the electrically driven gear pump is switched on and a certain system pressure value is set, which is selected to be at least so high that the compressive force of the system pressure in the third connection pressure chamber onto the release piston is at least greater than the preload force of the compression spring onto the closing body, which presses the closing body against the valve seat into the closing position. Simultaneously with the increase of the system pressure or after the certain system pressure value has been reached with the aid of the pressure-adjusting unit after a certain progression with respect to time, a clutch valve pressure in the second connection pressure chamber is raised until a clutch valve pressure value has been reached, at which the sum of the compressive force of the clutch valve pressure value and the force of the compression spring onto the release piston exceeds the compressive force of the system pressure value thereon, so that the release piston is displaced into its first stop position and the shift element is engaged with the aid of the closing body.

Preferably, it is possible that, after the engagement of the shift element with the aid of the closing body in the closing position, the system pressure is lowered to the ambient pressure by switching off the electrically driven gear pump and/or by changing the setting of the system pressure valve. The clutch valve pressure necessarily drops along with the system pressure, since the clutch valve pressure is controlled on the basis of the system pressure. The clutch valve pressure must never be lowered before the system pressure after the engagement of the shift element; otherwise the equilibrium of forces on the release piston is disturbed and the system pressure presses the release piston against the closing body, and so the closing body is displaced out of the closing position and, therefore, the shift element disengages toward the clutch valve.

In one further preferred example embodiment of the method, it is possible that, in order to disengage the shift element pressurized by the enclosed clutch pressure, the clutch valve spool of the pressure-adjusting unit is switched into the second switching position in which the second connection pressure chamber is non-pressurized, wherein, simultaneously or thereafter, the electrically driven gear pump is switched on and a system pressure having a certain system pressure value is set. The system pressure value is selected to be so high that the compressive force of the system pressure onto the release piston is greater than the sum of the preload force of the compression spring and the compressive force of the enclosed clutch pressure onto the closing body, which press the closing body against the valve seat into the closing position. The compressive forces of the system pressure and the clutch pressure result from the level of the particular pressures, multiplied by the surface areas of the pressure surfaces pressurized by the pressures on the release piston and the closing body.

BRIEF DESCRIPTION OF THE DRAWINGS

Exemplary embodiments of a hydraulic system according to the invention as well as of an associated pressure back-up valve are represented in the drawings and are described in greater detail in the following.

Wherein.

DETAILED DESCRIPTION

Figure 1:
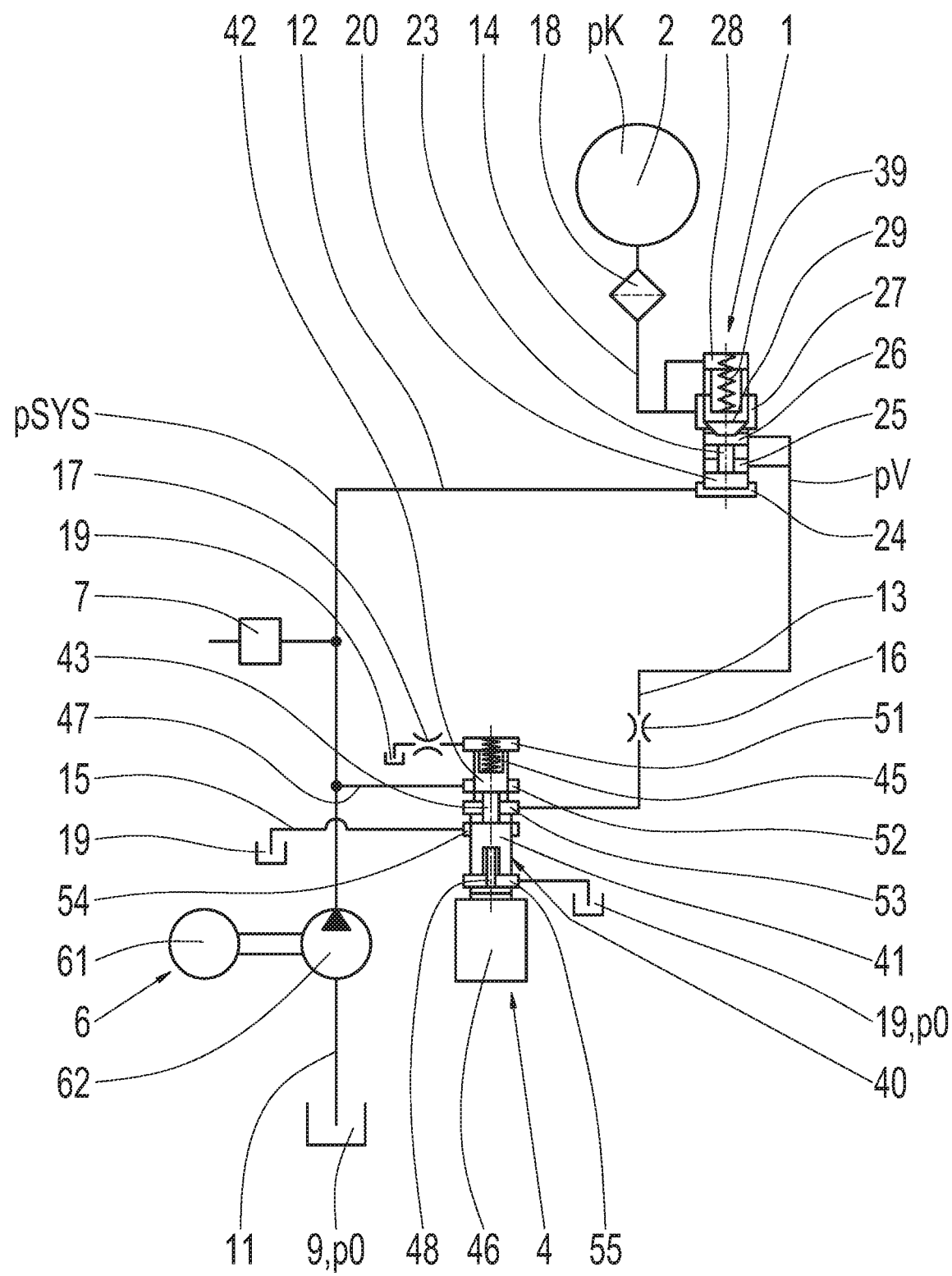
FIG. 1 shows a diagrammatic part view of a hydraulic circuit diagram of a hydraulic system according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic part view of a hydraulic circuit diagram of a hydraulic system according to example aspects of the invention for a transmission, in particular for an automatic transmission for an electric drive. The hydraulic system includes a first example embodiment of a pressure back-up valve 1, a shift element 2, a clutch valve 4 as a pressure-adjusting unit, an electrically driven gear pump 6 for generating a hydraulic pressure and flow, as well as a system pressure valve 7. The electrically driven gear pump 6 includes a pump 62 and an electric motor 61 driving the pump 62. With the aid of a suction line 11, the pump 62 scavenges the operating medium, preferably transmission oil, out of an oil sump 9 in which the transmission oil is stored. The pump 62 delivers the operating medium into a system pressure line 12 in which the system pressure pSYS prevails, and is connected in parallel to the pressure back-up valve 1 via the system pressure line 12 and to the clutch valve 4 via a supply line 47. The system pressure valve 7, with the aid of which the system pressure pSYS is adjustable, is connected to the system pressure line 12.

If the rotational speed of the electric motor 61 is changeable, the pump 62 of the electrically driven gear pump 6 can deliver a variable flow depending on the rotational speed of the driving electric motor 61 even if the pump 62 is designed as a pump having a fixed displacement. A pump having a fixed displacement can be designed, for example, as a gerotor pump or an external gear pump, as a single- or multi-stroke vane pump, or as a piston pump. Theoretically, the pump 62 could also be designed as a pump having a variable displacement, such as a variable displacement sliding vane pump or a variable displacement gerotor pump.

The clutch valve 4 include a valve spool 40, a compression spring 45, and a solenoid 46. The clutch valve spool 40 includes a first piston section 41 and a second piston section 42, both of which are cylindrical. The outer diameter of the piston section 41 is greater than that of the piston section 42.

A machined groove 43, which has a smaller outer diameter than the piston sections 41 and 42, is formed between the piston sections 41 and 42. The clutch valve spool 40 is axially displaceably guided in a valve bore. Connection pressure chambers 52 and 53 as well as bleed pressure chambers 51, 54 and 55 extend through the valve bore. The clutch valve 4 is supplied by the electrically driven gear pump 6 with the operating medium under system pressure pSYS via the supply line 47 and the connection pressure chamber 52. The clutch valve 4 is connected to the pressure back-up valve 1 via the connection pressure chamber 53 and a valve pressure line 13, wherein, optionally, a hydraulic resistance is arranged in the valve pressure line 13. The hydraulic resistance can be designed as an orifice or as a restrictor 16 as represented in the exemplary embodiment.

The solenoid 46 is activatable via an electronic transmission control unit (not represented), wherein, depending on the level of the activating current of the solenoid, a certain force and, therefore, a certain clutch valve pressure pV is generated in the valve pressure line 13. Whether the clutch valve pressure pV now increases or decreases as the current increases depends on whether the clutch valve 4 has an increasing or decreasing current-pressure characteristic curve. In the represented exemplary embodiment, an increasing current-pressure characteristic curve is assumed, i.e., the clutch valve pressure pV is proportional to the current that is applied to the solenoid 46. The clutch valve spool 40 is loaded at one end with the force of the solenoid 46 via a piston rod 48. This is opposed by the force of the compression spring 45, which is arranged at the other end of the clutch valve spool 40. The force of the solenoid 46, the force of the compression spring 45, and the different outer diameters of the piston sections 41 and 42 result in the level of a clutch valve pressure pV, which is adjustable in the valve pressure line 13 with the aid of the clutch valve 4.

In a first stop position of the clutch valve spool 40, when the force of the solenoid 46 is greater than the force of the compression spring 45, the connection pressure chambers 52 and 53 are connected to each other via the machined groove 43 and the system pressure pSYS also acts in the pressure line 13. If the force of the solenoid 46 is so low that the force of the compression spring 45 displaces the valve spool 40 into a second stop position, the connection pressure chamber 53 and, therefore, the pressure line 13 are connected to the bleed pressure chamber 54, so that the clutch valve pressure pV can decrease to an ambient pressure p0 into a non-pressurized area 19 of the hydraulic system. The ambient pressure p0 corresponds to the atmospheric pressure surrounding the hydraulic system. Any number of control positions of the valve spool 40 and, therefore, any number of pressure values of the clutch valve pressure p4 between the value of the system pressure pSYS and the ambient pressure p0 are possible between the two stop positions as described above, depending on the level of the current. The clutch valve 4 is therefore also referred to as a pressure-adjusting unit, an electronic pressure regulator (EPR), a pressure control valve, or a proportional valve.

The pressure back-up valve 1 includes a control device 101 and a closing device 102. The control device 101 includes a release piston 20 and the closing device 102 includes a closing body 29 and a compression spring 39. The release piston 20, the closing body 29, and the compression spring 39 are arranged in a valve bore having different inner diameters. An actuating pressure chamber 24, three connection pressure chambers 25, 26 and 27, as well as a spring chamber 28 extend through the valve bore. The compression spring 39 is arranged in the spring chamber 28 in a preloaded manner, acting on the closing body 29. The connection pressure chamber 27 and the spring chamber 28 are connected to the shift element 2 via a clutch pressure line 14. Optionally, a filter 18 is arranged in the clutch pressure line 14. The connection pressure chambers 25 and 26 are connected to the clutch valve 4 via the valve pressure line 13.

In the non-pressurized condition of the hydraulic system, the closing body 29 is pressed by the preloaded compression spring 39 into a closing position in which the closing body 29 interrupts a hydraulic connection between a connection pressure chamber 26 and a connection pressure chamber 27 and, therefore, blocks off the shift element 2 from the rest of the hydraulic system. The hydraulic system is in a non-pressurized condition for the case in which the pump 62 is at rest and, therefore, does not deliver. Alternatively, a non-pressurized condition can be induced when the system pressure valve 7 is adjusted in such a way that the system pressure pSYS at least approximately corresponds to the ambient pressure p0. In the exemplary embodiment shown, the closing body 29 is designed as a partially hollow-cylindrical piston including a hemispherical or semispherical end.

If the system pressure pSYS prevails in the system pressure line 12 during the operation of the hydraulic system, the system pressure pSYS acts upon the release piston 20 in the actuating pressure chamber 24 and displaces the release piston 20 or holds it in a second stop position in which a push rod 23 formed on the release piston 20 acts upon the closing body 29 and displaces the closing body 29, against the force of the compression spring 39, out of the closing position into an opening position, so that the connection pressure chambers 26 and 27 are hydraulically connected to each other. As a result, the shift element 2 is hydraulically connected to the clutch valve 4 via the pressure back-up valve 1, so that the clutch valve pressure pV set by the clutch valve 4 is also active in the shift element 2, and so the clutch pressure pK corresponds to the clutch valve pressure pV. The level of the clutch pressure pK is then based on the energization of the solenoid 46 of the clutch valve 4.

The engagement of the shift element 2 and the enclosure and holding of the clutch pressure pK are described with reference to FIGS. 2 and 3, since these represent the pressure back-up valve in substantially greater detail.

If the shift element 2 engaged under the clutch pressure pK is to be disengaged, the shift element 2 must be transferred into an at least approximately non-pressurized condition. The basic condition is a low system pressure pSYS or a non-pressurized system pressure line 12 due to an electrically driven gear pump 6 being switched off. In order to reduce the clutch pressure pK to the level of the ambient pressure p0, the system pressure pSYS is increased at least so far that the release piston 20 moves the closing body 29 out of the closing position, in order to connect the second connection pressure chamber 26 and the third connection pressure chamber 27 to each other and, therefore, to connect the shift element 2 to the clutch valve 4 via the valve pressure line 13. The energization of the clutch valve 4 is to be selected in such a way, in this case, that the valve spool 40 of the clutch valve 4 is in the second stop position, so that the connection pressure chambers 53 and 54 are connected to each other and, therefore, the valve pressure line 13 is connected, via a drain line 15, to a non-pressurized area 19 of the hydraulic system. This is also referred to as bleeding the valve pressure line 13 and/or the shift element 2.

Figure 2:
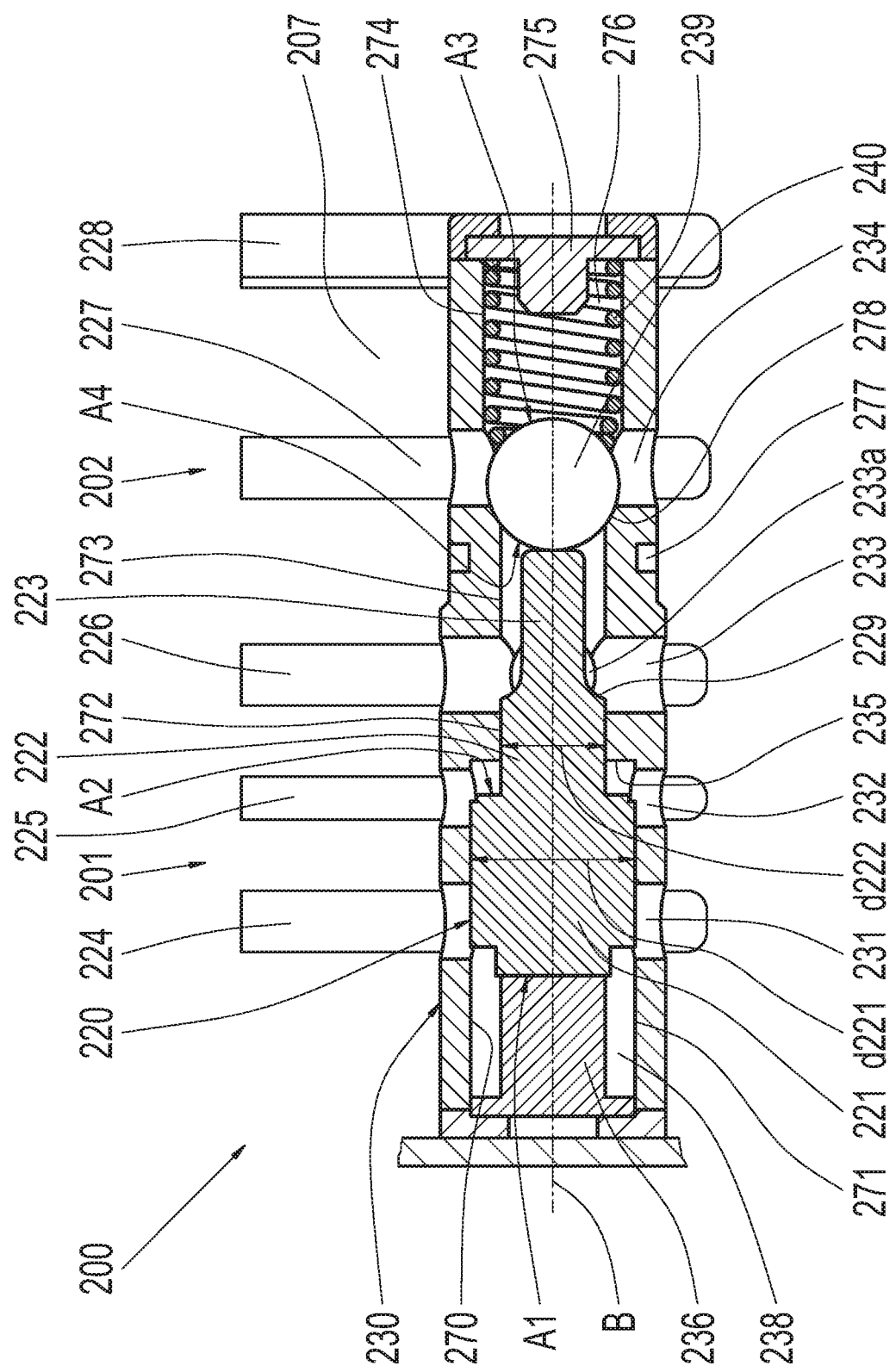
FIG. 2 shows a diagrammatic longitudinal section of a second example embodiment of a pressure back-up valve in a first switching position.
Figure 3:
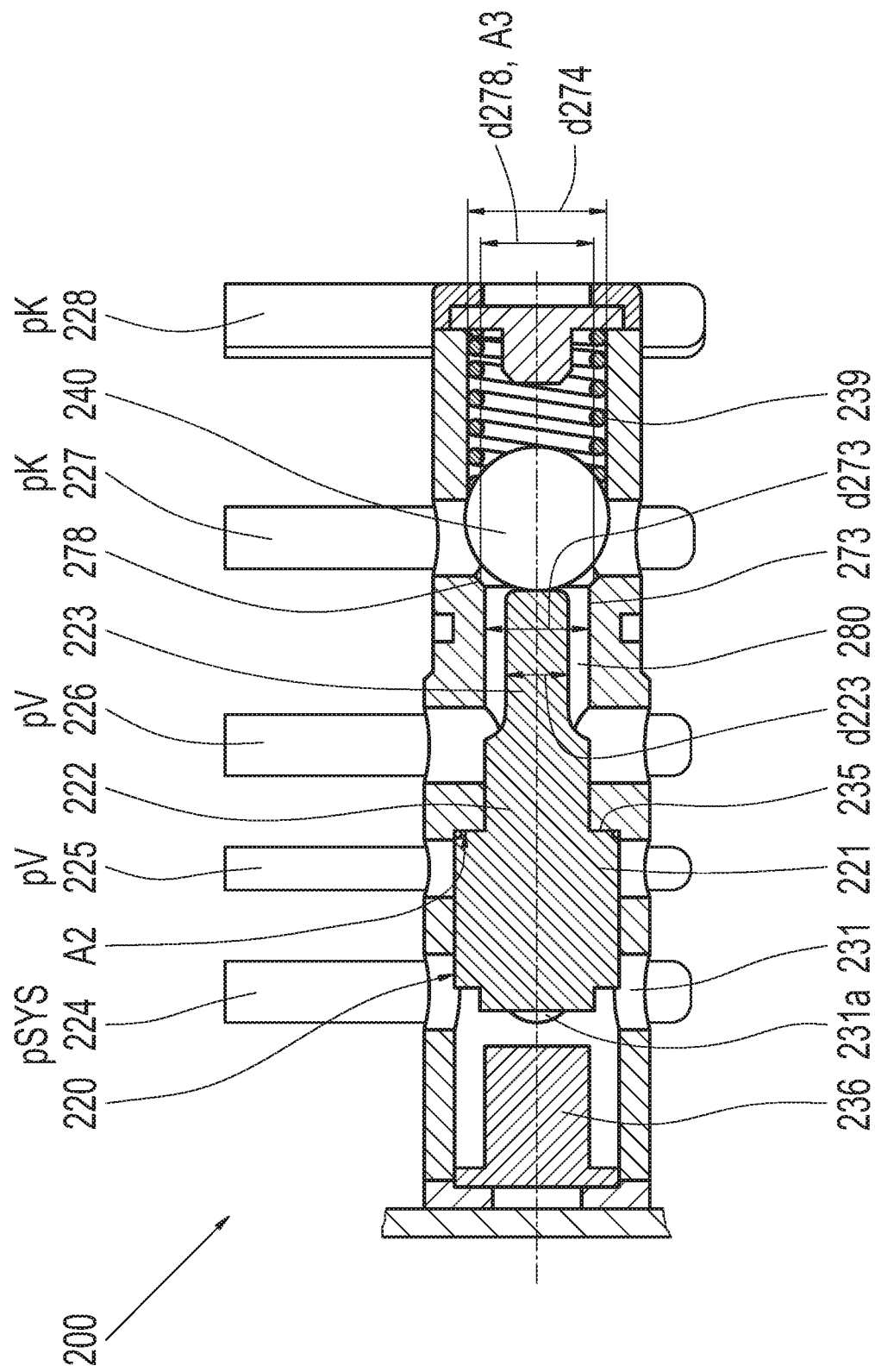
FIG. 3 shows a diagrammatic longitudinal section of a second example embodiment of a pressure back-up valve in a second switching position.

FIGS. 2 and 3 show a diagrammatic longitudinal section of a second example embodiment of a pressure back-up valve 200 in two different switching positions. FIG. 2 shows the pressure back-up valve 200 with elements in positions in which the shift element (not represented) is closed with respect to the rest of the hydraulic system. In FIG. 3, the elements are in positions in which the shift element can be filled and pressurized or depressurized.

The pressure back-up valve 200 includes a control device 201, a closing device 202, a cylindrical valve housing 230, a stop bolt 236, and a spring chamber cover 275 as a support element. The control device 201 includes a release piston 220, which is in a first stop position in FIG. 2 and in a second stop position in FIG. 3. The closing device 202 includes a compression spring 239, a valve seat 278, which is arranged or formed in the valve housing 230, and a ball 240 as the closing body. The closing device 202 is therefore designed as a seat valve. The valve housing 230 is embedded into a housing body 207 in which, for example, a bore hole is formed for accommodating the valve housing 230. Five connection pressure chambers 224, 225, 226, 227 and 228 are formed in the housing body 207, which continue as connection bores 231, 232, 233 and 234 in the valve housing 230. The connection bores 231 through 234 are designed as radially directed transversal bores perpendicular to a bore axis B of a valve bore 270. In order to achieve a flow cross-section that is as large as possible and, therefore, a low flow resistance through the pressure back-up valve, multiple connection bores are formed at an axial position, as shown in the exemplary embodiment on the basis of the connection bores 231 and 231a as well as 233 and 233a.

An O-ring groove 277, into which an O-ring (not represented) can be inserted, is formed radially from the outside in the cylindrical external contour of the valve housing 230. The O-ring prevents leakage between the connection pressure chambers 226 and 227. The housing body 207 can be, for example, a portion of the transmission housing of an automatic transmission. The pressure back-up valve 200 can therefore be inserted into the housing body 207 completely, as a preassembled unit.

The valve bore 270 includes multiple bore sections 271, 272, 273 and 274, which partly have different inner diameters. In the bore sections 271 and 272, the release piston 220 is axially displaceably guided between the stop bolt 236 and a stop surface 235 formed in the valve housing 230. The release piston 220 includes three piston sections 221, 222 and 223, wherein the piston section 221 forms a clearance fit with the bore section 271 and the piston section 222 forms a clearance fit with the bore section 272. The release piston 220 is axially displaceably guided in the particular piston sections.

The piston section 223, which is also referred to as a push rod, is at least partially surrounded by the bore section 273, whose inner diameter d273 is considerably greater than an outer diameter d223 of the push rod 273. As a result, a passage 280 is formed between the push rod 273 and the valve housing 230 in the area of the bore section 273. The passage 280 exists in any possible axial position of the release piston 220. Via the passage 280, the operating medium from the connection pressure chamber 226 can reach the connection pressure chamber 227 and, therefore, the shift element. In order to ensure that the passage 280, which is formed by the push rod 223 and the bore section 273, is designed to be as favorable as possible with respect to flow, a transition radius 229 is formed at the transition from the push rod 223 to the piston section 222.

If the pressure back-up valve 200 is incorporated into a hydraulic system similarly to the pressure back-up valve 1 in FIG. 1, the connection pressure chambers 225 and 226 are pressurizable by a clutch valve pressure pV and the connection pressure chambers 227 and 228 are pressurizable by a clutch pressure pK. A system pressure pSYS prevails in the connection pressure chamber 224 during the operation of the hydraulic system when the electrically driven gear pump 6 is switched on. The release piston 220 is pressurizable in the connection pressure chamber 224 by the system pressure pSYS via a pressure surface A1. The pressure surface A1 is the axial projected area of the piston section 221 and is calculated as a circular surface from an outer diameter d221 of the piston section 221. Counteracting this, the release piston 220 can be pressurized by the clutch valve pressure pV in the connection pressure chambers 225 and 226 via a pressure surface A2, which is as large as the pressure surface A1.

The connection pressure chambers 227 and 228 are both connected to the shift element and, therefore, also to each other, which is not represented in FIGS. 2 and 3. The connection pressure chamber 228 is optionally provided and is necessary, for example, when, in the opening position of the ball 240 represented in FIG. 3, there would be a flow cross-section between the ball 240 and the valve housing 230 that is too small in the area of the bore section 274. As a result, during a displacement of the ball 240 against the compression spring 239 into a spring chamber 276, it could be possible that the operating medium enclosed there could not be displaced quickly enough and, therefore, a back pressure could build up. This can be avoided, however, with the aid of structural measures. These include, for example, a greater diameter difference between the ball 240 and the bore section 274, or a greater axial extension of the connection pressure chamber 227, so that, during a displacement of the ball 240 into the opening position, the operating medium can be displaced out of the spring chamber 276 without a pressure increase in the spring chamber 276.

In addition, due to the arrangement of the connection pressure chamber 228, the operating medium cannot depressurize in a finite time in a sealing gap formed between an external contour of the valve housing 230 and the housing body 207 during an initial filling of the pressure back-up valve 200 after the engagement of the shift element. This would result, namely, in a pressure loss in the shift element, which would result in an undesirable reduction of the torque that can be transmitted by the shift element. This could also be avoided with the aid of alternative structural measures, such as a longitudinal groove in the sealing gap between the valve housing 230 and the housing body 207, with the aid of which the operating medium could quickly spread.

In the representation in FIG. 2, the pressure back-up valve 200 is shown in a switching position in which the shift element is engaged and/or its pressure chamber (not shown) is closed with respect to the rest of the hydraulic system by the closing body designed as a ball 240. The ball 240 is in the closing position. This is possible because the release piston 220 is in its first stop position. The bore section 274 has an inner diameter d274, which is greater than the outer diameter of the ball 240. The valve seat 278 is formed, in the valve housing 230, in the transition from the bore section 274 to the bore section 273. In the engaged condition, the ball 240 rests against the valve seat 278 and seals off the connection pressure chambers 226 and 227 with respect to each other. A spring chamber cover 275 is arranged, secured at least against an axial displacement, at the end of the valve housing 230 in the bore section 274. A compression spring 239 is arranged in a preloaded manner between the spring chamber cover 275 and the ball 240, in the spring chamber 276, surrounded by the bore section 274. The preload force of the compression spring 239 presses the ball 240 against the valve seat 278 if the connection pressure chamber 226 is non-pressurized and the release piston 220 is in the first stop position at the stop bolt 236 as represented. FIG. 3 shows the release piston 220 in the second stop position. Due to this position of the release piston 220, the ball 240 is in the opening position.

In this operating condition, the clutch pressure pK prevails in the shift element and in the spring chamber 276, where the clutch pressure pK acts, together with the force of the compression spring 239, upon a pressure surface A3 of the ball 240. The effective pressure surface A3 of the ball 240 in the axial projection results as a circular surface having a diameter that corresponds to an effective diameter d278 of the valve seat 278. The effective diameter of the valve seat is understood to be the radial extension of the circular line of contact that results when the ball rests against the valve seat. The pressure surface A3 of the closing body or the ball is the same size as a pressure surface A4. When the closing body or the ball is in the closing position, the pressure surface A3 is pressurized via the connection pressure chamber 227 and the pressure surface A4 is pressurized via the connection pressure chamber 226. The term "axial" is understood to mean in the direction of the bore axis B.

Figure 6:
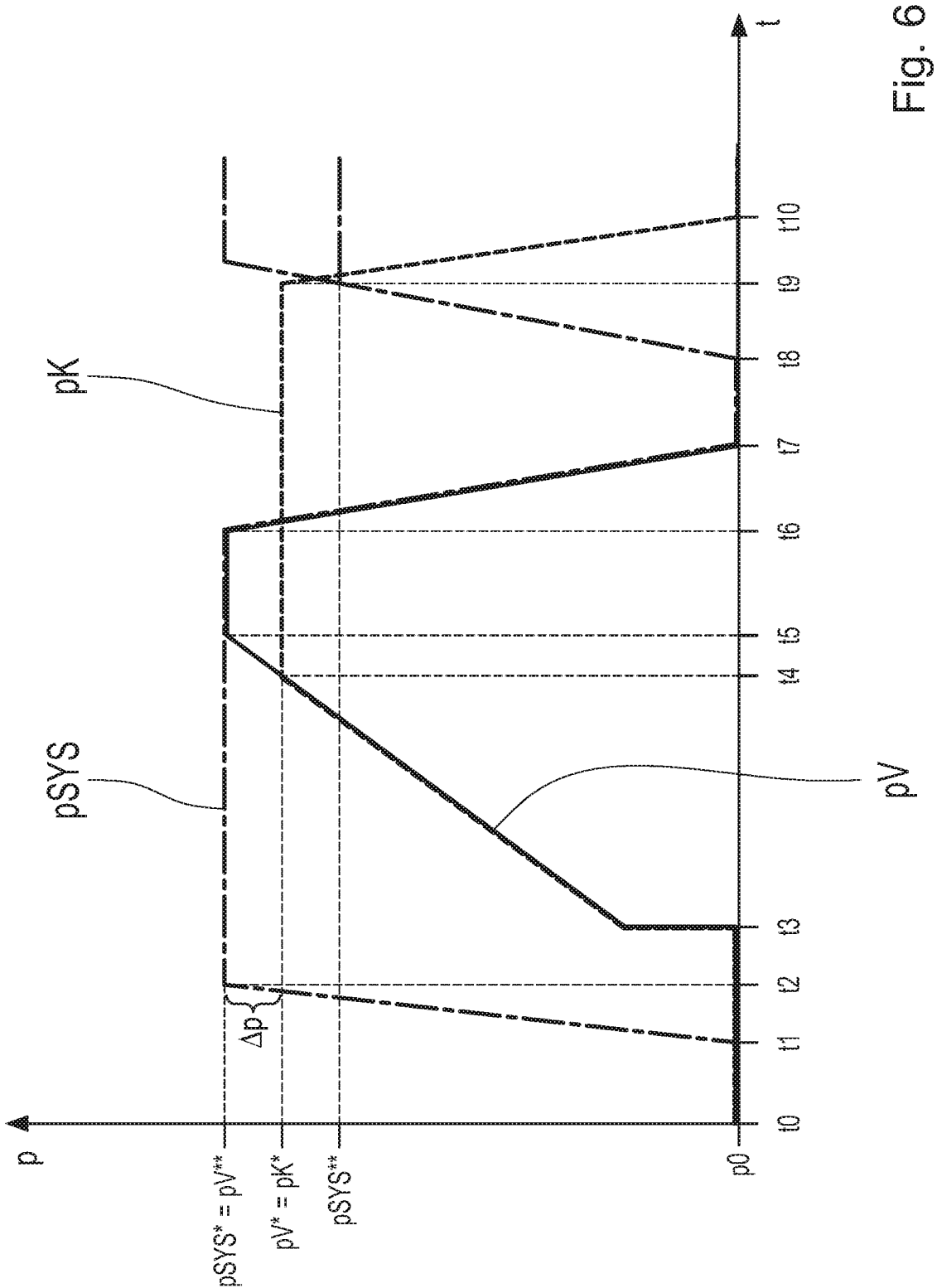
FIG. 6 shows a diagram including the progressions of different pressures with respect to time during the actuation of the hydraulic system comprising a pressure back-up valve according to example aspects of the invention.

The function of the pressure back-up valve 200 in cooperation with a hydraulic system represented in FIG. 1 is described in the following with reference to the timing diagram in FIG. 6 viewed in combination with FIGS. 1, 2 and 3. The relevant pressures of the hydraulic system, namely the system pressure pSYS, the clutch valve pressure pV, and the clutch pressure pK are plotted on the ordinate, a pressure axis p, with respect to the time axis t as the abscissa. The distances between the points in time t1 through t10 on the time axis t are not full-scale and are utilized only for illustrating the mode of operation of the hydraulic system comprising a pressure back-up valve according to example aspects of the invention.

At a point in time t0, the electrically driven gear pump 6 is still switched off. The system pressure pSYS as well as the clutch valve pressure pV, which is controlled on the basis thereof with the aid of the clutch valve 4, as well as the clutch pressure pK pressurizing the shift element 2 are pressureless, i.e., correspond to the ambient pressure p0. Alternatively, the gear pump 6 can also be switched on and the system pressure valve 7 sets a system pressure pSYS, which corresponds to the ambient pressure p0. Therefore, the particular pressure prevailing in each of the connection pressure chambers 224, 225, 226, 227 and 228 also corresponds to the ambient pressure p0. Under the preload of the compression spring 239, the ball 240 is pressed against the valve seat 278 and the connection pressure chambers 226 and 227 are separated from each other. The release piston 220 is in the first stop position at the stop bolt 236 (FIG. 2).

At the point in time t1, the electrically driven gear pump 6 is switched on (or the system pressure pSYS is increased with the aid of the system pressure valve 7) and the system pressure pSYS builds up in a steep ramp according to the setting of the system pressure valve 7 until the system pressure pSYS has reached a system pressure value pSYS* at a point in time t2. Via the system pressure line 12, the release piston 220 is pressurized in the connection pressure chamber 224 by the system pressure pSYS and is displaced against the stop surface 235 into the second stop position (see FIG. 3) as soon as the force from the system pressure pSYS in connection with the pressure surface A1 exceeds the force of the compression spring 239 counteracting the release piston 220. During the travel of the release piston 220 into the second stop position, the push rod 223 of the release piston 220 moves the ball 240 against the preload force of the compression spring 239 out of the closing position into an opening position. In this opening position, a hydraulic connection is established between the connection pressure chambers 226 and 227 and, therefore, between the clutch valve 4 and the shift element 2. The clutch valve 4 is not energized at the point in time t2, and so the valve pressure line 13 and the shift element 2 are connected via the clutch valve 4 to a non-pressurized area 19 of the hydraulic system and, therefore, are non-pressurized (pV=pK=p0) if the clutch valve 4 is an electrical pressure control valve having an increasing current-pressure characteristic curve. This is understood to mean that the pressure set by the pressure-adjusting unit also increases as the current increases.

The clutch valve 4 supplied by the system pressure pSYS is now energized at a point in time t3, whereby the clutch valve pressure pV in the valve pressure line 13 is increased, in a closed-loop controlled manner in a selected ramp, according to the progression of the output current over time. In this case, the clutch valve 4 is designed as a pressure control valve having an increasing characteristic curve. The shift element 2 is filled via the connection pressure chambers 226 and 227 of the released pressure back-up valve 200 and is pressurized with the clutch valve pressure pV set by the clutch valve 4, so that the progressions of the clutch pressure pK and the clutch valve pressure pV are congruent.

The energization of the clutch valve 4 is controlled by an open-loop system in such a way that, at a point in time t5, the valve spool 40 of the clutch valve 4 is to assume a second stop position in which the clutch valve pressure pV would reach a value that corresponds to the system pressure value pSYS*. Before the clutch valve pressure pV reaches the system pressure value pSYS*, however, an equilibrium of forces sets in at the release piston 220 at a point in time t4. A compressive force from the clutch valve pressure pV and the pressure surface A2 and the force of the compression spring 239 counteract the compressive force from the system pressure pSYS and the pressure surface A1. The pressure surface A2 is pressurized, overall, in the connection pressure chambers 225 and 226. In an example embodiment of the pressure back-up valve according to FIGS. 4 and 5, the pressure surface A2 is pressurized only in the connection pressure chamber 326. The surface areas of the pressure surfaces A1 and A2 are identical in the exemplary embodiments shown in FIGS. 2 through 5.

Since the clutch valve pressure pV increases further in the direction of the system pressure value pSYS*, the release piston 220 is displaced into the first stop position when a clutch valve pressure value pV* is exceeded at the point in time t4, so that the closing body 29 or the ball 240 can be displaced by the compression spring 39 or 239, respectively into the closing position. As a result, a clutch pressure pK, which has a clutch pressure value pK*, is enclosed in the shift element 2 (FIG. 2). The clutch pressure value pK* corresponds to the clutch valve pressure pV*. The clutch pressure value pK* of the enclosed clutch pressure is therefore reduced by a pressure differential $\Delta p$ with respect to the system pressure pSYS of the system pressure value pSYS*. The pressure differential $\Delta p$ is calculated as $\Delta p = pSYS^* - pK^*$ and is dependent on the force of the compression spring 39 and on the ratio of the pressure surfaces A1 and A2. At the point in time t5, the clutch valve pressure pV reaches a clutch valve pressure value pV**, which corresponds to the system pressure value pSYS*.

The clutch pressure pK, which has the clutch pressure value pK*, prevailing in the shift element 2 is therefore enclosed and holds the shift element 2 engaged, as desired, so that a torque transmission with the aid thereof is possible if the shift element is designed as a normally open shift element. Since the enclosed clutch pressure pK is independent of the system pressure pSYS after the point in time t4, the system pressure pSYS no longer needs to be generated by the electrically driven gear pump 6. In order to save energy for the hydraulic system and, therefore, increase the overall efficiency of the transmission, the system pressure pSYS could theoretically be lowered at the point in time t5. For the sake of clarity, in the representation in FIG. 6, the system pressure pSYS as well as the clutch valve pressure pV were held constant up to a point in time t6.

The lowering of the system pressure pSYS to be generated by the electrically driven gear pump 6 can take place by switching off the gear pump 6. The system pressure pSYS will decrease due to existing leakage points, such as the sealing gap of the pump 62, into the oil sump 9. As the system pressure pSYS decreases, the clutch valve pressure pV also decreases; the clutch valve pressure pV is controlled on the basis of the system pressure pSYS and, therefore, is directly dependent thereon. This takes place at the point in time t6 in the diagram in FIG. 6. The system pressure pSYS and the clutch valve pressure pV decrease to the ambient pressure p0 over the time t up to a point in time t7. The clutch pressure pK is enclosed in the shift element 2 and is still at the clutch pressure value pK*, so that the shift element 2 remains engaged.

Alternatively, a reduction of the system pressure pSYS with the aid of the system pressure valve 7, which reduces the system pressure pSYS, would also be possible. In this case as well, the clutch valve pressure pV, which is dependent on the system pressure pSYS, would follow the system pressure pSYS.

Additionally, in both possibilities, the energization of the clutch valve 4 can be reduced or completely switched off, in order to reduce the set clutch valve pressure pV and prepare for a subsequent opening of the pressure back-up valve 200. It is important in this case that the value of the clutch valve pressure pV never drop below the value of the system pressure pSYS. A reduction of the clutch valve pressure pV must therefore not take place before the reduction of the system pressure pSYS, since, as a result, the equilibrium of forces at the release piston 220 is eliminated and, due to the still existing system pressure pSYS, the release piston 220 would be displaced into its second stop position. This would result in an undesirable lifting of the ball 240 off of the valve seat 278 and, therefore, in a disengagement of the shift element 2. In order to reliably avoid such a disengagement process, in one further alternative example method, the clutch valve pressure pV is not reduced before the electrically driven gear pump 6 is switched off, or the system pressure pSYS was lowered to the level of the ambient pressure p0 by switching off the electrically driven gear pump 6 or by changing the setting of the system pressure valve 7. This means, in the diagram in FIG. 6, a reduction of the energization of the clutch valve 4 (in the case of a clutch valve having a decreasing characteristic curve, an increase of the energization) first takes place at a point in time t7. It is therefore ensured that the closing body 29 or the ball 240 remains in the closing position.

Since the clutch valve 4 in the exemplary embodiment has an increasing characteristic curve, when the energization of the solenoid 46 is switched off, the valve spool 40 moves into a stop position in which the valve pressure line 13 is connected via the connection pressure chambers 53 and 54 as well as the drain line 15 to the non-pressurized area 19 of the hydraulic system, which is also referred to as "bled".

If the shift element is now to be disengaged, the system pressure pSYS is to be increased at a point in time t8. The clutch valve pressure pV corresponds, at the point in time t8, to the ambient pressure p0 and, in the exemplary embodiment shown, is not increased with the system pressure pSYS. The solenoid 46 remains non-energized and the valve pressure line 13 is therefore non-pressurized due to the connection via the clutch valve 4 to the non-pressurized area 19. The system pressure pSYS acts upon the pressure surface A1 of the release piston 220 and presses the release piston 220 against the ball 240, which is loaded by the force of the compression spring 239 and the force of the clutch pressure pK, which has the clutch pressure value pK*, acting upon the pressure surface A3, against the release piston 220. Since the pressure surface A3 is smaller than the pressure surface A1, the ball 240 is displaced, at a point in time t9, into the opening position already once a system pressure value pSYS has been reached. In the exemplary embodiment shown, the system pressure value pSYS is less than the clutch pressure value pK*. As a result, the shift element 2 is connected via the clutch valve 4 to the non-pressurized area 19, so that the clutch pressure pK, which has the clutch pressure value pK*, can theoretically decrease to the ambient pressure p0, which is reached at a point in time t10.

It is also possible, however, that, given a suitable actuation of the clutch valve 4, the clutch pressure pK is decreased according to a certain pressure-time profile and can also be reduced to a valve pressure value that is above the ambient pressure p0. For this purpose, the clutch valve 4 would need to be energized in a suitable way at the point in time t9, in order to therefore generate a progression of the clutch valve pressure pV over time.

Starting at the opening of the closing body 29 or the ball 240 at the point in time t9, the system pressure pSYS could be held at the system pressure value pSYS** (lower horizontal dash-dotted line) with the aid of the system pressure valve 7 or increased further up to the maximum system pressure value pSYS* (upper horizontal dash-dotted line) or adjusted to any system pressure value between the system pressure values pSYS* and pSYS**. It would be most favorable with respect to energy, starting at the point in time t10, after the pressure reduction of the clutch pressure pK has been completed, to switch off the electrically driven gear pump 6 and, therefore, to also reduce the system pressure pSYS to the ambient pressure p0. Therefore, the condition at the point in time t0 would be reached.

The details regarding the energization of the clutch valve apply, as mentioned above, provided the clutch valve is designed as a pressure control valve having an increasing current-pressure characteristic curve. If the clutch valve would have a decreasing current-pressure characteristic curve, the valve pressure line and the connection pressure chambers constantly connected thereto would be non-pressurized upon complete energization of the clutch valve.

Figure 4:
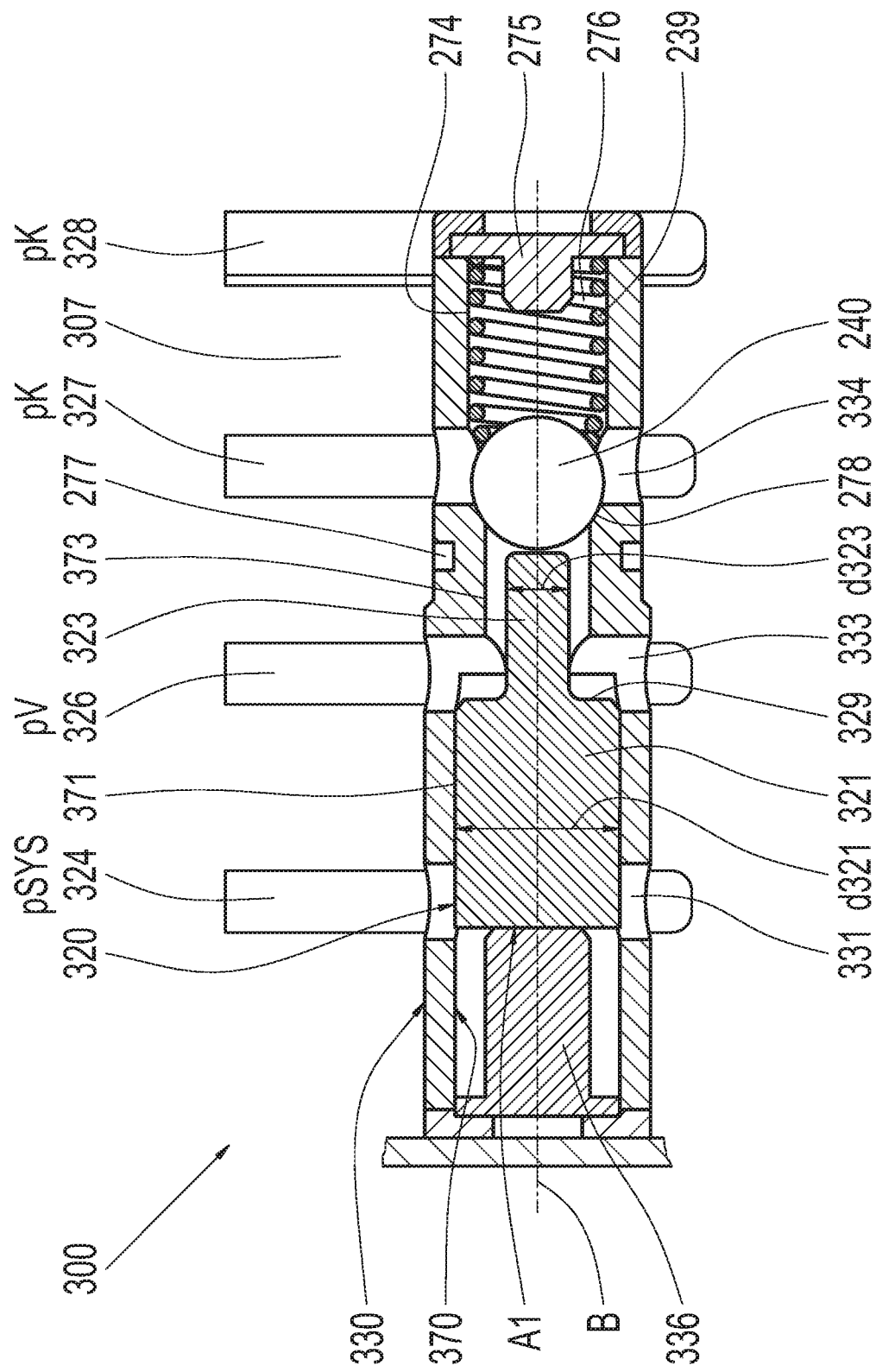
FIG. 4 shows a diagrammatic longitudinal section of a third example embodiment of a pressure back-up valve in a first switching position.
Figure 5:
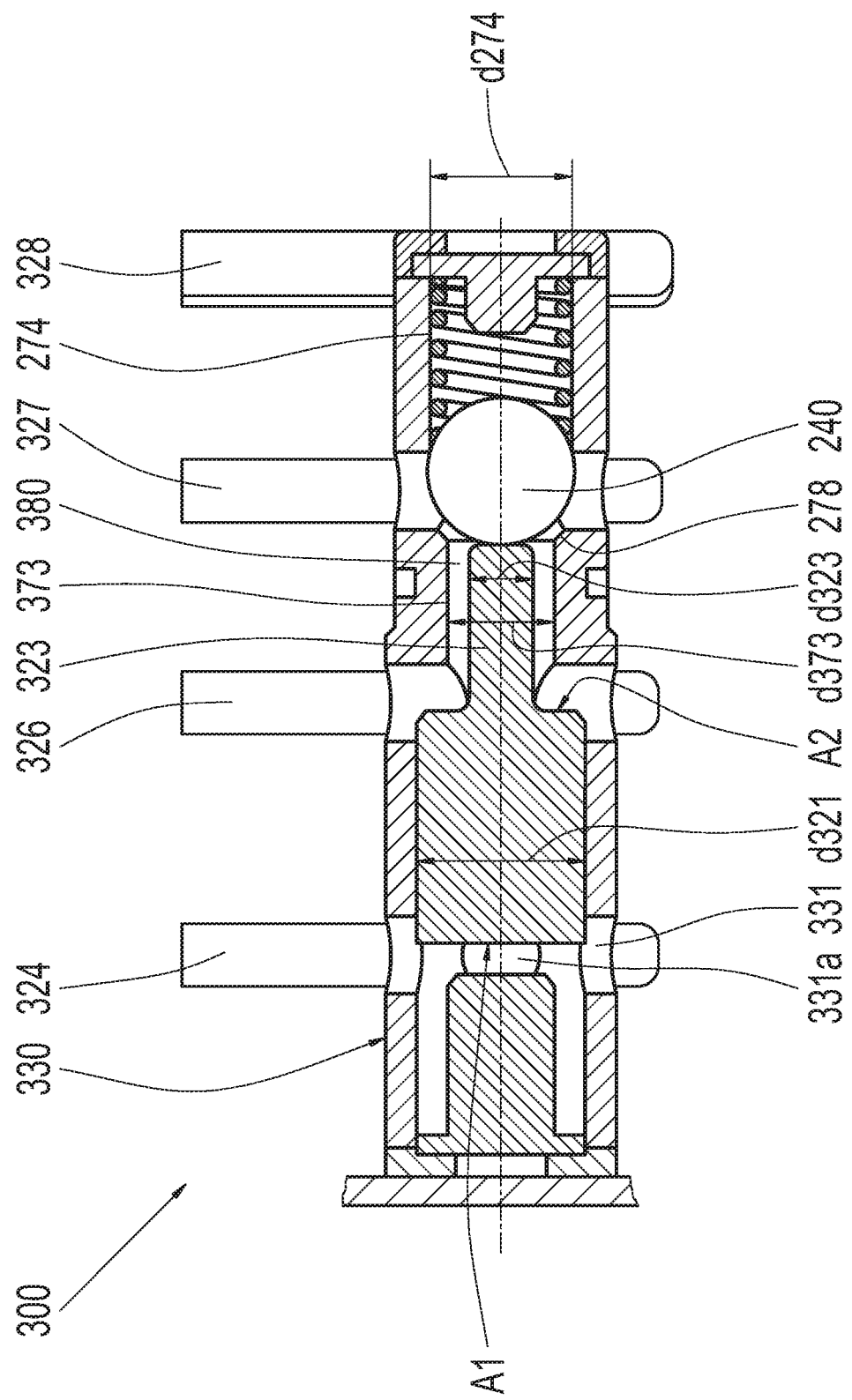
FIG. 5 shows a diagrammatic longitudinal section of a third example embodiment of a pressure back-up valve in a second switching position.

FIGS. 4 and 5 show a pressure back-up valve 300 as an alternative example embodiment of the pressure back-up valve 200. The most substantial differentiating features are that the pressure back-up valve 300 includes only four connection pressure chambers 324, 326, 327 and 328, wherein the connection pressure chamber 328 can be optionally present, similarly to the connection pressure chamber 228 associated with the pressure back-up valve 200. Of the connection pressure chambers, only the connection pressure chamber 326 is connected to the clutch valve. A release piston 320 of a control device 301 includes only two piston sections 321 and 323, wherein the piston section 323 forms a push rod, which can act mechanically upon the ball 240. Therefore, the release piston 320 is designed to be substantially simpler than the release piston 220. As a result, the clutch valve pressure pV acts only in the connection pressure chamber 326 upon the overall pressure surface A2. Advantageously, the pressure back-up valve 300 can be designed to be simpler overall than the pressure back-up valve 200. Corresponding to the reduced number of connection pressure chambers, transversal bores 331, 333 and 334 extend through a valve housing 330 only at three different axial positions, wherein multiple transversal bores can be formed at one and the same axial position, in order to increase the flow cross-section. This is shown in the exemplary embodiment shown on the basis of the transversal bores 331 and 331*a* (FIG. 5), which are situated perpendicularly to one another, but which can also enclose other angles, which can be formed.

FIG. 4 shows the release piston 320 in the first stop position in which the ball 240 is in its closing position.

FIG. 5 shows the release piston 320 in the second stop position in which the release piston 320 has displaced the ball 240 into the opening position. The release piston 320 rests via a stop surface 337 against a stop (not shown), so that the ball 240 cannot be pushed into a bore section 274 of the valve bore 370 any farther than is represented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

1 pressure back-up valve
2 clutch, shift element
4 EPR, pressure regulator, clutch valve
6 electrically driven gear pump
7 system pressure valve
9 oil sump
11 suction line
12 system pressure line
13 valve pressure line
14 clutch pressure line
15 drain line
16 restrictor, orifice
17 restrictor, orifice
18 filter
19 non-pressurized area, bleeding
20 release piston
21 piston section
22 piston section
23 piston section, push rod
24 third connection pressure chamber
25 fourth connection pressure chamber
26 second connection pressure chamber
27 first connection pressure chamber
28 spring chamber
29 closing body
39 compression spring
40 clutch valve spool
41 piston section
42 piston section
43 machined groove
45 compression spring
46 solenoid
47 supply line
48 piston rod
51 spring chamber
52 connection pressure chamber
53 connection pressure chamber
54 bleed compression chamber
55 bleed compression chamber
61 electric motor
62 pump
101 control device
102 closing device
200 pressure back-up valve
201 control device
202 closing device
207 housing body
220 release piston
221 piston section
222 piston section
223 piston section, push rod
224 third connection pressure chamber
225 fourth connection pressure chamber
226 second connection pressure chamber
227 first connection pressure chamber
228 connection pressure chamber
229 transition radius
230 valve housing
231 connection bore
232 connection bore
233 connection bore
234 connection bore
235 stop surface
236 stop bolt
239 compression spring
240 closing body, ball
270 valve bore
271 bore section
272 bore section
273 bore section
274 bore section
275 spring chamber cover, support element
276 spring chamber
277 O-ring groove
278 valve seat
280 passage
300 pressure back-up valve
307 housing body
320 release piston
321 piston section
323 piston section, push rod
324 third connection pressure chamber
326 second connection pressure chamber
327 first connection pressure chamber
328 connection pressure chamber
329 transition radius
330 valve housing
331 connection bore
331*a* connection bore
333 connection bore 333a connection bore
334 connection bore
336 stop bolt
337 stop surface
370 valve bore
371 bore section
373 bore section
380 passage
A1 pressure surface
A2 pressure surface
A3 pressure surface
A4 pressure surface
B bore axis
d221 outer diameter of the piston section 221
d222 outer diameter of the piston section 222
d223 push rod diameter
d273 inner diameter of the bore section 273
d274 inner diameter of the bore section 274
d278 effective diameter of the valve seat 278
d321 outer diameter of the piston section 321
d323 push rod diameter
d373 inner diameter of the bore section 373
p pressure
p0 ambient pressure
pK clutch pressure
pK* clutch pressure value
pSYS system pressure
pSYS* system pressure value
pSYS** system pressure value
pV clutch valve pressure
pV* clutch valve pressure value
pV** clutch valve pressure value
Δp pressure differential (Δp=pSYS*−pK*)
t time, time axis
t1 point in time
t2 point in time
t3 point in time
t4 point in time
t5 point in time
t6 point in time
t7 point in time
t8 point in time
t9 point in time
t10 point in time

The invention claimed is:

1. A pressure back-up valve (1, 200, 300) for a transmission, comprising:
a control device (101, 201, 301);
a closing device (102, 202, 302); and a valve housing (230, 330),
wherein the control device (101, 201, 301) comprises a release piston (20, 220, 320), and the closing device (102, 202, 302) comprises a closing body (29, 240, 340),
wherein the valve housing (230, 330) comprises a plurality of connection pressure chambers (24, 25, 26, 27, 28, 224, 225, 226, 227, 228, 324, 326, 327, 328) with at least a first connection pressure chamber (27, 227, 327), a second connection pressure chamber (26, 226, 326), and a third connection pressure chamber (24, 224, 324),
wherein the release piston (20, 220, 320) is movable into a first stop position and a second stop position,
wherein the closing body (29, 240, 340) is movable into a closing position in which the closing body (29, 240, 340) separates the first connection pressure chamber (27, 227, 327) and the second connection pressure chamber (26, 226, 326) when the release piston (20, 220, 320) is in the first stop position,
wherein the release piston (20, 220, 320) in the second stop position is mechanically active upon the closing body (29, 240, 340) such that the release piston (20, 220, 320) is in an opening position in which the first connection pressure chamber (27, 227, 327) and the second connection pressure chamber (26, 226, 326) are hydraulically connected,
wherein the plurality of connection pressure chambers (24, 25, 26, 27, 28, 224, 225, 226, 227, 228, 324, 326, 327, 328) are arranged such that the release piston (20, 220, 320) is pressurizable from a first side via the third connection pressure chamber (24, 224, 324) on a first pressure surface (A1) and is pressurizable from a second side via at least the second connection pressure chamber (26, 226, 326) on a second pressure surface (A2), and
wherein the closing body (29, 240, 340) is pressurizable from a first side via the second connection pressure chamber (26, 226, 326) on a first pressure surface (A4) of the closing body and (29, 240, 340) from a second side via the first connection pressure chamber (27, 227, 327) on a second pressure surface (A3) of the closing body (29, 240, 340) when the closing body (29, 240, 340) is in the closing position.

2. The pressure back-up valve (200) of claim 1, wherein:
the plurality of connection pressure chambers includes a fourth connection pressure chamber (225);
a portion of the second side of the release piston (220) is pressurizable in the second connection pressure chamber (226) and the remaining portion of the second side is pressurizable in the fourth connection pressure chamber (225); and
in sum, a surface of the second side of the release piston (220) is pressurized, a surface area of the surface of the second side corresponding to the second pressure surface (A2).

3. The pressure back-up valve (200, 300) of claim 1, wherein the two pressure surfaces (A1, A2) of the release piston (220, 320) have the same surface area.

4. The pressure back-up valve (1, 200, 300) of claim 1, wherein:
the closing body (240) is axially movable in a bore section (274) of the valve housing (230, 330);
the closing body (240), in the closing position, rests against a valve seat (278) such that the valve seat (278) and the closing body (240) form a seat valve;
the bore section (274) comprises the first connection pressure chamber (227, 327) and also comprises a further connection pressure chamber (228, 328) at an end of the valve housing (230, 330); and
wherein the first connection pressure chamber (227, 327) and the further connection pressure chamber (228, 328) are hydraulically connected within or outside the valve housing (230, 330).

5. The pressure back-up valve (1, 200, 300) of claim 4, wherein:
the closing device (102, 202, 302) comprises a compression spring (39, 239);
a support element (275) is arranged or formed at the end of the valve housing (230, 330) in the bore section (274);
the compression spring (239) is arranged in a preloaded manner between the support element (275) and the closing body (29, 240); and a force of the compression spring (39, 239) is active upon the closing body (29, 240) in a direction of the closing position.

6. The pressure back-up valve of claim 4, wherein the valve seat (278) is formed or arranged in the valve housing (230, 330), and the closing body is a ball (240).

7. The pressure back-up valve (200, 300) of claim 1, wherein the valve housing (230, 330) is cylindrical on an external contour of the valve housing (230, 330), and the valve housing (230, 330) comprises a valve bore (270, 370) with a plurality of bore section (271, 272, 273, 274, 371, 372, 373), at least some of the inner diameters (d273, d274, d373) of the bore section (271, 272, 273, 274, 371, 372, 373) being different.

8. The pressure back-up valve of claim 1, wherein the first pressure surface (A1) of the release piston (20, 220, 320) is pressurizable by a system pressure (pSYS), and the first pressure surface (A1) is larger than the second pressure surface (A3) of the closing body (29, 240).

9. A hydraulic system for a transmission, comprising:
the pressure back-up valve (1, 200, 300) of claim 1;
an electrically driven gear pump (6);
a pressure-adjusting unit (4); and
a shift element (2),
wherein the electrically driven gear pump (6) generates a system pressure (pSYS) during operation and is hydraulically connected in parallel to the pressure back-up valve (1) and the pressure-adjusting unit (4),
wherein the pressure-adjusting unit (4) is connectable to the shift element (2) via the pressure back-up valve (1), and
wherein a clutch pressure (pK) in the shift element (2) is adjustable with the pressure-adjusting unit (4) when the closing device is open.

10. The hydraulic system of claim 9, wherein:
the electrically driven gear pump (6) is connected to the third connection pressure chamber (24) of the pressure back-up valve (1) such that, during operation of the electrically driven gear pump (6), the release piston (20) is pressurized by the system pressure (pSYS);
the second connection pressure chamber (226) is connected to the pressure-adjusting unit (4) and is pressurizable by a clutch valve pressure (pV); and
the first connection pressure chamber (227) is hydraulically connected to the shift element (2) such that the shift element (2) is pressurizable by the pressure back-up valve (1) with the clutch valve pressure (pV) set by the pressure-adjusting unit (4) when the closing body (29) is in the opening position.

11. The hydraulic system of claim 10, wherein:
the pressure-adjusting unit (4) comprises a clutch valve spool (40) and a solenoid (46);
the clutch valve spool (40) is movable into a first stop position, a second stop position, and a control position with a solenoid (46) in depending on an energization of the solenoid (46),
in the first stop position, the second connection pressure chamber (26) of the pressure back-up valve (1) is connected to the electrically driven gear pump (6);
in the second stop position, the second connection pressure chamber (26) of the pressure back-up valve (1) is connected to a non-pressurized area (19); and
in the control position between the first and second stop positions, a pressure value between an ambient pressure (p0) and the system pressure (pSYS) is settable in the second connection pressure chamber (26) such that, in the second stop position of the clutch valve spool (40), the shift element (2) is depressurizable or drainable when the closing body (29) is in the opening position.

12. The hydraulic system of claim 9, wherein the system pressure (pSYS) generated by the electrically driven gear pump (6) is active upon the release piston (20) from the first side in the third connection pressure chamber (24), and the force of the compression spring (39) and the clutch valve pressure (pV) set by the pressure-adjusting unit (4) are active upon the release piston (20) from the second side.

13. A transmission for an electric drive, comprising the hydraulic system of claim 9.

14. A method for operating the hydraulic system of claim 9, comprising:
in order to fill and pressurize the shift element (2) and in order to enclose the clutch pressure (pK) in the shift element (2), starting with the clutch valve spool (40) of the pressure-adjusting unit (4) already positioned in the second switching position or switching the clutch valve spool (40) to the second switching position, the second connection pressure chamber (26) being non-pressurized in the second switching position; and
simultaneously or thereafter, activating the electrically driven gear pump (6) and/or setting a certain system pressure value (pSYS*), wherein the certain system pressure value (pSYS*) is selected such that a compressive force of the system pressure (pSYS) in the third connection pressure chamber (24) onto the release piston (20) is at least greater than a preload force of the compression spring (39) onto the closing body (29), which presses the closing body into the closing position;
simultaneously with the increase of the system pressure (pSYS) or after the certain system pressure value (pSYS*) has been reached with the aid of the pressure-adjusting unit (4) after a certain progression with respect to time (t), raising a clutch valve pressure (pV) in the second connection pressure chamber until a clutch valve pressure (pV*) value has been reached, at which a sum of the compressive force of the clutch valve pressure value (pV*) and the force of the compression spring (39) onto the release piston (20) exceeds the compressive force of the certain system pressure value (pSYS*) such that the release piston (20) displaces into the first stop position and the shift element (2) is engaged via the closing body (29).

15. The method of claim 14, further comprising, after engagement of the shift element (2), lowering the system pressure (pSYS) by switching off the electrically driven gear pump (6) and/or by changing a setting of the system pressure valve (7).

16. A method for operating the hydraulic system of claim 9, comprising:
in order to disengage the shift element (2) pressurized by the enclosed clutch pressure (pK), switching the clutch valve spool (40) of the pressure-adjusting unit (4) into the second switching position in which the second connection pressure chamber (26) is non-pressurized; and
simultaneously or thereafter, activating the electrically driven gear pump (6) and setting a system pressure value (pSYS*, pSYS**), wherein the system pressure value (pSYS*, pSYS**) is selected such that a compressive force of the system pressure (pSYS) onto the release piston (20) is greater than a sum of a preload force of the compression spring (39) and a compressive force of the enclosed clutch pressure ($pK^*$) onto the closing body (29), which press the closing body (29) into the closing position.

\* \* \* \* \*